United States Patent [19]

Smith

[11] Patent Number: 5,025,663
[45] Date of Patent: Jun. 25, 1991

[54] RATE OF ANGULAR ACCELERATION SENSOR

[75] Inventor: Charles P. Smith, Harvard, Mass.

[73] Assignee: Raytheon Company, Lexington, Mass.

[21] Appl. No.: 371,342

[22] Filed: Jun. 26, 1989

[51] Int. Cl.$^5$ .............................................. G01P 15/11
[52] U.S. Cl. ................................................ 73/517 A
[58] Field of Search ............... 73/517 A, 517 B, 510, 73/517 R, 650; 324/146; 310/36

[56] References Cited

U.S. PATENT DOCUMENTS

| | | | |
|---|---|---|---|
| 2,656,519 | 10/1953 | Sheppard | 73/517 A |
| 3,074,060 | 1/1963 | Kadlec | 324/146 |
| 3,250,996 | 5/1966 | Fleetman | 324/146 |
| 3,348,080 | 10/1967 | Lair | 310/36 |
| 3,794,868 | 2/1975 | Haigh | 324/146 |
| 4,207,769 | 6/1980 | Andrews | 73/517 A |
| 4,302,720 | 11/1981 | Brill | 324/146 |
| 4,584,569 | 4/1986 | Lopez et al. | 73/650 |
| 4,825,697 | 5/1989 | Huber | 73/517 A |

*Primary Examiner*—John Chapman
*Attorney, Agent, or Firm*—Edmund J. Walsh; Richard M. Sharkansky

[57] ABSTRACT

A sensor for measuring the rate of angular acceleration of an object around an axis of rotation. The sensor is relatively easy to assemble. The sensor has a fixed coil and a rotating magnet mounted on bearings with a torsion spring providing a restoring torque.

12 Claims, 2 Drawing Sheets

RATE OF ANGULAR ACCELERATION SENSOR

BACKGROUND OF THE INVENTION

This invention relates generally to inertial measurement systems and more specifically to measuring changes in angular acceleration around an axis.

In certain systems, it is desirable to measure changes in angular acceleration. Such systems include inertial navigation systems. In many inertial navigation systems, gyros are mounted in gimbals, allowing the gyro to move freely relative to the gimbals. The gimbals are affixed to some object being navigated. As is known, the axis of the gyro tends not to rotate in relation to an inertial coordinate system. If the object rotates, the gimbals move to compensate for the fact that the gyro does not rotate. The position of the gimbals thus gives an indication of the angular motion of the object being navigated. Appropriate steering commands can then be generated.

A problem arises because the gyro has associated with it a natural frequency of nutation. Even small amounts of force applied to the gyro at this natural frequency can cause the gyro to precess or nutate around its axis of rotation. The position of the gimbals then would no longer indicate the position of the object.

In some inertial navigation systems, active damping is used to avoid problems of nutation of the gyros. A rate of angular acceleration sensor is mounted on the gimbals. When this sensor produces a signal indicating the gyro is nutating, an electronic circuit actuates a control circuit which applies forces to the gyro. These forces counteract the nutation.

Existing rate of angular acceleration sensors are precision devices made in small quantities. A substantial amount of hand assembly by skilled workers is required to produce the devices. It would be desirable to develop a rate of angular acceleration sensor which can be simply and inexpensively manufactured.

SUMMARY OF THE INVENTION

It is an object of this invention to provide a rate of angular acceleration sensor which can be simply and inexpensively manufactured.

The foregoing and other objects of this invention are achieved by a cylindrical magnet mounted on a shaft through a coil. Torsion springs apply a restoring torque to the magnet. Electrical outputs are taken from the coil.

BRIEF DESCRIPTION OF THE DRAWINGS

The foregoing and other objects of this invention can be better understood by reference to the following more detailed description and accompanying drawings in which.

DESCRIPTION OF THE PREFERRED EMBODIMENT

Figure 1:
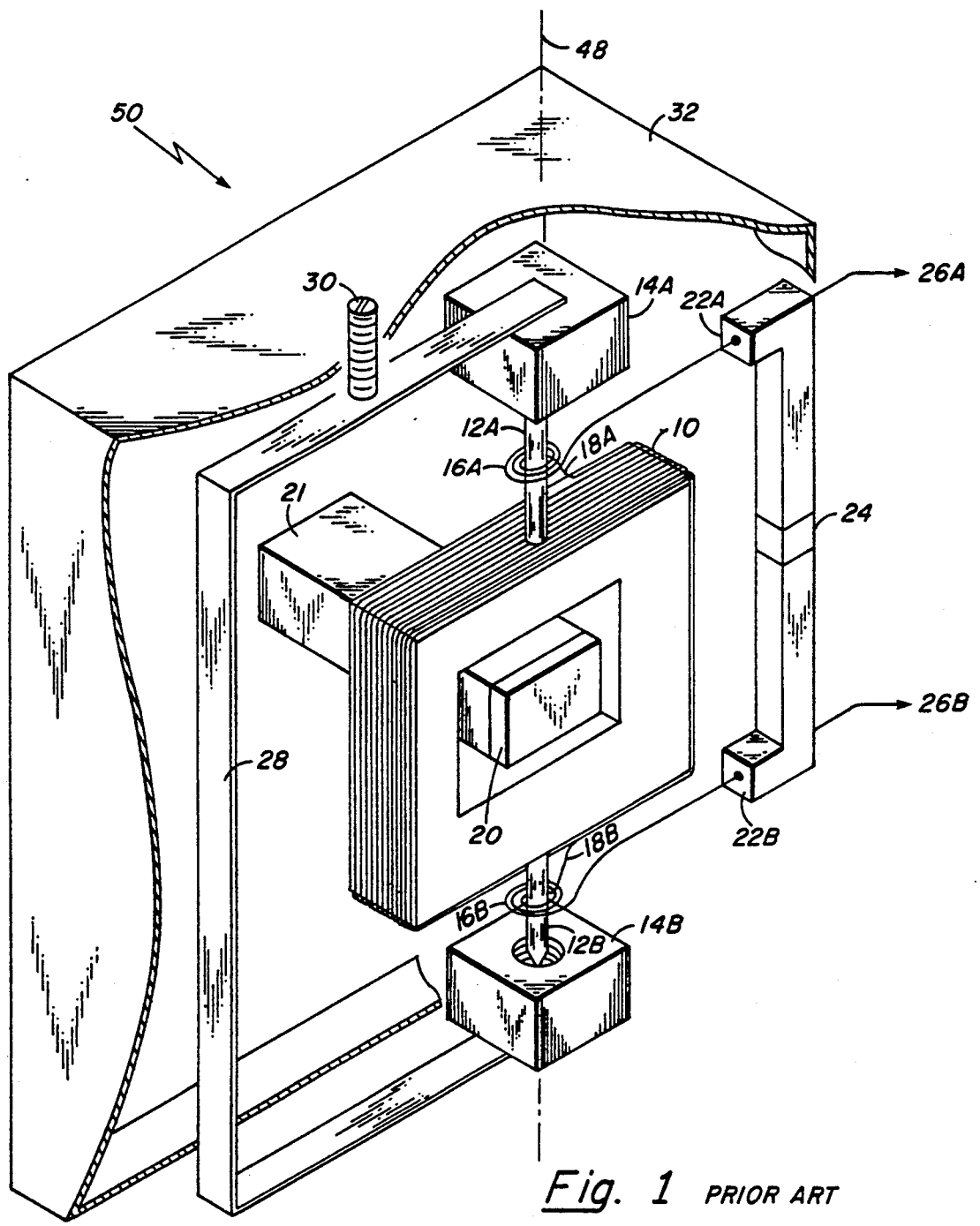
FIG. 1 illustrates a prior art rate of angular acceleration sensor.

FIG. 1 shows a prior art rate of angular acceleration sensor. A magnet 20 is mounted in a housing 32. Magnet 20 is positioned in the center of a coil 10 by support 21. Posts 12A and 12B are attached to two ends of coil 10 and rest in blocks 14A and 14B and act as bearings for the assembly. Blocks 14A and 14B are held in place by bracket 28, mounted to housing 32. The position of blocks 14A and 14B can be adjusted by set screw 30. Tightening set screw 30 pushes blocks 14A and 14B together and sets the preload on the bearings.

Posts 12A and 12B and blocks 14A and 14B are constructed so as to make low friction bearings, for example, jeweled bearings. Posts 12A and 12B define an axis 48 around which coil 10 rotates. The rate of angular acceleration sensor produces an electrical output signal on lines 26A and 26B proportional to the rate of change of acceleration of the sensor around this axis of rotation.

Springs 16A and 16B are mounted to posts 12A and 12B, respectively, and blocks 22A and 22B, respectively. Blocks 22A and 22B are affixed to housing 32. Thus, when coil 10 rotates relative to housing 32, springs 16A and 16B are deformed, thereby putting a restoring torque on coil 10.

The way in which rate of angular acceleration sensor 50 produces an electric signal may be understood as follows. When housing 32 accelerates around axis 48, no torque is coupled to coil 10 through the jeweled bearings formed by posts 12A and 12B and blocks 14A and 14B. Due to the inertia of coil 10, coil 10 does not initially accelerate around axis 48. However, as housing 32 and coil 10 rotate at different rates, two things would happen. First, coil 10 would pass through magnetic flux attributable to magnet 20. This would induce a voltage in coil 10.

Second, different acceleration rates would mean that coil 10 would rotate relative to housing 32. This relative motion deforms springs 16A and 16B. Springs 16A and 16B then put torque on coil 10, tending to change the angular acceleration of coil 10 to match the acceleration of housing 32. The amount which springs 16A and 16B must be deformed to put the required torque on coil 10 depends on the difference in acceleration between coil 10 and housing 32. Thus, it can be seen that each time the angular acceleration of housing 32 changes, coil 10 will rotate relative to housing 32 in proportion to that change. Greater rotation of coil 10 causes it to pass through more lines of magnetic flux from magnet 20, causing a greater voltage to be induced in the coil. The fact that magnet 20 extends through coil 10 is not normally a problem since coil 10 normally rotates only a few degrees.

The voltage induced in coil 10 is coupled to lines 26A and 26B. End 18A of the wire making up coil 10 is connected to spring 16A. End 18B of the wire making up coil 10 is connected to spring 16B. Springs 16A and 16B are constructed of electrically conducting material. The voltage developed across coil 10 is therefore also developed across blocks 22A and 22B. Lines 26A and 26B are connected to blocks 22A and 22B. It should be noted that blocks 22A and 22B are electrically isolated, such as by insulating block 24 or some other convenient means.

To assemble the rate of angular acceleration sensor of FIG. 1, certain relatively complicated operations must be performed. Springs 16A and 16B must be attached to posts 12A and 12B and to blocks 22A and 22B. Wire ends 18A and 18B must be connected to springs 16A and 16B. Posts 12A and 12B must also be connected to coil 10 such that coil 10 is balanced with respect to axis of rotation 48. In addition, set screw 30 must be adjusted so that there is no "end play" in coil 10. In other words, blocks 14A and 14B must be brought together so that coil 10 cannot move along axis 48.

Each of these assembly operations can be costly due to the precise nature of the work. Rate of angular acceleration sensor 150 in FIG. 2 avoids these costly assembly steps.

Figure 2:
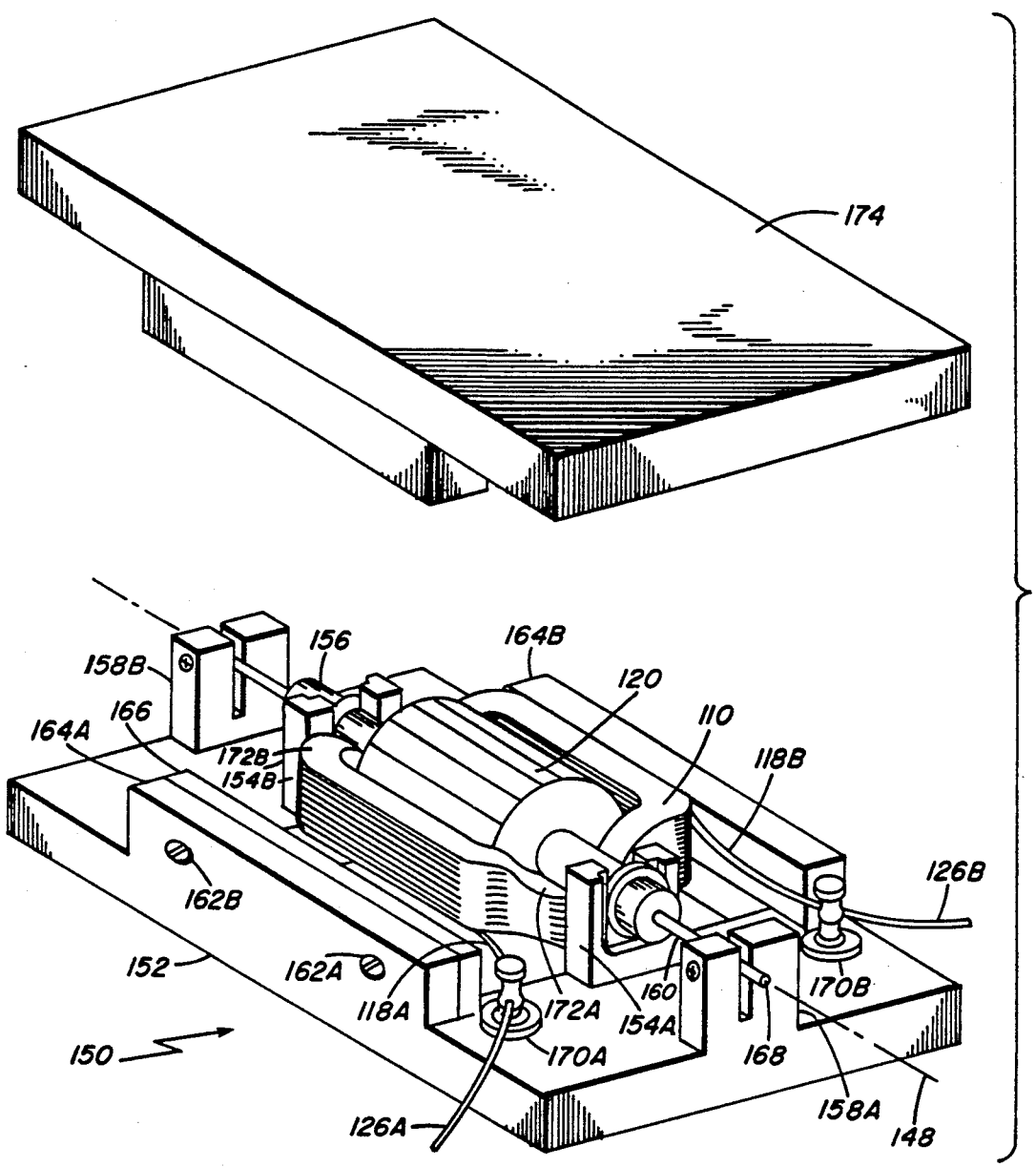
FIG. 2 illustrates a rate of angular acceleration sensor according to the invention.

FIG. 2 shows rate of angular acceleration sensor 150 constructed according to the present invention. Coil 110 is mounted to frame 152. A cylindrical magnet 120 is mounted on shaft 156 in the center of coil 110. Coil 110 contains depressions 172A and 172B such that shaft 156 fits over coil 110 without requiring a hole in coil 110. Shaft 156 is connected at two ends to bearing systems 154A and 154B of known construction. Magnet 120 is thus free to rotate about axis of rotation 148.

Figure 3:
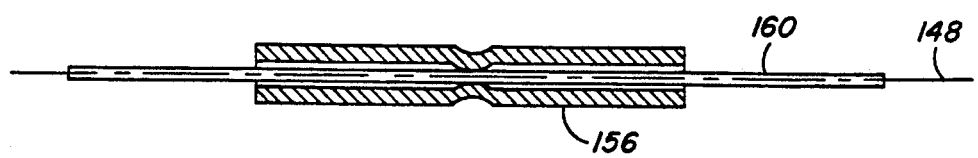
FIG. 3 shows the connection of a torsion spring to the shaft of the rate of angular acceleration sensor in FIG. 2.

A restoring torque is provided by torsion spring 160. As shown more clearly in FIG. 3, torsion spring 160 passes through shaft 156. Torsion spring 160 is attached to the shaft in its center, such as by crimping the shaft. As shown in FIG. 2, torsion spring 160 is fixed at each end, using screws or any other known method, to blocks 158A and 158B. Thus, it can be seen that when shaft 156 rotates around axis 148, torsion spring 160 is twisted and provides a torque around axis 148. Here, torsion spring 160 and shaft 156 are constructed with any known materials.

Coil 110 is attached to base 152. It could be "potted" or mounted in any convenient manner. Ends 118A and 118B of the wire forming coil 110 are attached, such as by soldering, to posts 170A and 170B, respectively. Lines 126A and 126B are also attached to posts 170A and 170B. Lines 126A and 126B are the electrical outputs of rate of angular acceleration sensor 150. Any voltage developed in coil 110 thus appears across lines 126A and 126B.

Base 152 provides a path for magnetic flux from magnet 120. Base 152 is formed from soft iron or some other material which supports the magnetic flux. Cover 174 fits over base 152 and is secured in any known manner to provide a closed path for the magnetic flux. It will be noted by one of skill in the art that pole pieces 164A and 164B of base 152 should be as close as practical to coil 110 to maximize the flux through coil 110 and therefore the output voltage.

Base 152 contains pole pieces 164A and 164B. The placement of these pieces impacts the amount of flux through portions of coil 110. The flux through each portion determines the amount of voltage induced which in turn impacts the force on magnet 120. If the gap between pole pieces 164A and 164B and magnet 120 are not the same, the magnetic force on magnet 120 may become unbalanced around axis of rotation 148, thereby creating excessive friction in bearing systems 154A and 154B. To avoid the friction, pole piece 164A contains a separate piece 166 which may be positioned relative to magnet 120 by means of set screws 162A and 162B. Set screws 162A and 162B are adjusted to equalize the flux through each portion of coil 110 and ensure magnet 120 rotates with minimum friction.

It can be seen that the rate of angular acceleration sensor 150 provides a signal the same as prior art rate of angular acceleration sensor 50 (FIG. 1). Rotation of magnet 120 relative to coil 110 induces a voltage between lines 126A and 126B. Magnet 120 rotates relative to coil 110 whenever the acceleration of base 152 changes. The amount of rotation is proportional to the change of angular acceleration.

Rotation of base 152 about axis of rotation 148 does not cause magnet 120 to rotate because magnet 120 is free to rotate on bearings 154A and 154B. If base 152 rotates and magnet 120 does not, torsion spring 160 will be deformed. Torsion spring 160 will be deformed until it puts a torque on magnet 120 sufficient to accelerate magnet 120 to have the same angular acceleration as base 152. When the angular acceleration of base 152 changes, magnet 120 will rotate relative to coil 110 an amount proportional to that change of acceleration. This rotation induces a voltage in coil 110 which is measured at lines 126A and 126B.

Therefore, rate of angular acceleration sensor 150 produces the desired voltage but can be constructed more simply than sensor 50 (FIG. 1). Centering cylindrical magnet 120 on shaft 156 is relatively simple. Cylindrical magnet 120 has relatively uniform mass density. Its center of rotation can be determined by locating the geometric center of the cylinder. Also, the arrangement eliminates end play. Torsion spring 160, since it is fixed to blocks 158A and 158B, inhibits end play. Bearing systems 154A and 154B also inhibit end play. Moreover, electrical connections to coil 110 are simply made because the coil is stationary.

The fact that the rotating piece in FIG. 2 is magnet 120 in FIG. 2 but is coil 10 in FIG. 1 is significant because magnet 120 is significantly heavier. Thus, torsion springs could be used instead of coil springs since torsion springs have higher spring constants. The torsion spring is easier to attach, lower cost and more durable than the coil springs.

Having described one embodiment of the invention, various alternative embodiments will be apparent to one of skill in the art. The scope of this invention should therefore be limited only by the appended claims.

What is claimed is:

1. A sensor for measuring the rate of angular acceleration around an axis, comprising:
    a) a coil having an opening therein;
    b) a magnet mounted along the axis and in the opening of the coil;
    c) a torsion spring passing through the magnet along the axis and fixedly coupled to the magnet; and
    d) two wires electrically coupled to the coil wherein the voltage across the wires indicates the rate of angular acceleration.

2. The sensor of claim 1 additionally comprising:
    a) a shaft, passing through the magnet along the axis; and
    b) a bearing system rotatably supporting the shaft.

3. The sensor of claim 2 additionally comprising:
    a) a base fixedly attached to the coil, the bearing system and the torsion spring.

4. The sensor of claim 3 wherein the magnet is cylindrical.

5. Apparatus for measuring change of angular acceleration comprising:
    a) a base;
    b) a coil, having an opening therein, fixedly mounted to the base;
    c) a magnet rotatably mounted to the base, said magnet mounted in the opening of the coil;
    d) a spring fixedly coupled to the magnet and to the base; and
    e) output means for producing an electrical signal proportional to the voltage induced in the coil due to change of angular acceleration.

6. The apparatus of claim 5 wherein the spring comprises a torsion spring.

7. The apparatus of claim 6 wherein the magnet is mounted on a shaft.

8. The apparatus of claim 7 wherein the shaft has a hole therethrough and the torsion spring passes through the hole in the shaft and is fixedly attached to the shaft.

9. The apparatus of claim 7 wherein the coil has a depression formed therein and the shaft is disposed in the depression.

10. The apparatus of claim 5 wherein the base comprises soft iron.

11. The apparatus of claim 5 wherein
a) the coil has a first side and a second side; and
b) the base has a first piece parallel to the first side of the coil and a second piece parallel to the second piece.

12. The apparatus of claim 11 wherein the base comprises a third piece parallel to the first piece, said third piece adjustably mounted to the first piece.

* * * * *